July 23, 1968  H. G. KAYSER ET AL  3,394,094
PROCESS OF PREPARING A PAVING COMPOSITION
Filed April 20, 1964
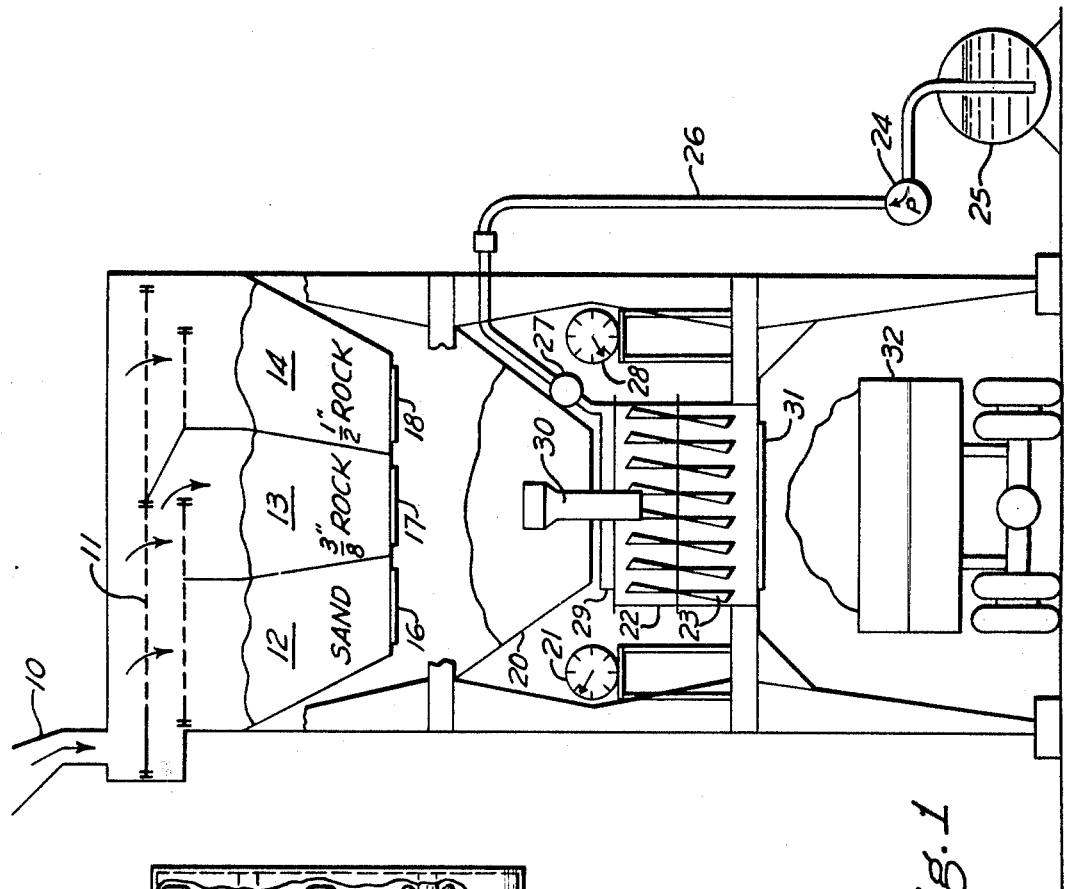
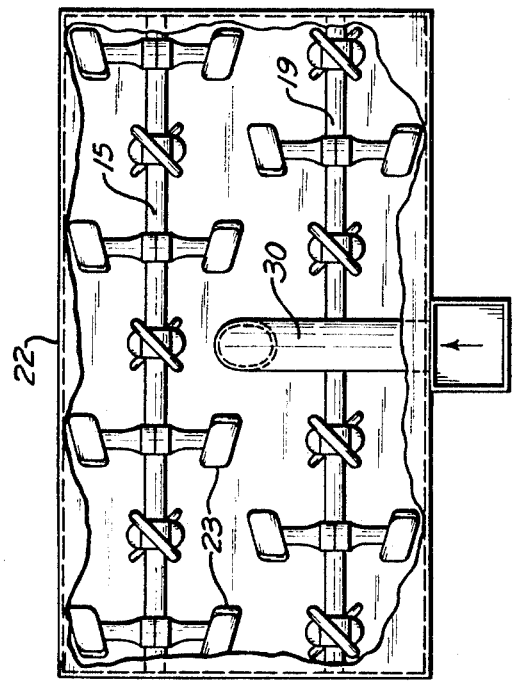
INVENTORS.
HENRY G. KAYSER
EMMETT J. WOODWARD, JR.

United States Patent Office 3,394,094
Patented July 23, 1968

3,394,094
PROCESS OF PREPARING A PAVING
COMPOSITION
Henry G. Kayser, Garden Grove, and Emmett J. Woodward, Jr., Canoga Park, Calif., assignors to Industrial Asphalt of California, Inc., Van Nuys, Calif., a corporation of Delaware
Filed Apr. 20, 1964, Ser. No. 361,162
6 Claims. (Cl. 260—28.5)

ABSTRACT OF THE DISCLOSURE

An improved paving composition is obtained by coating aggregate with asphalt having a penetration (ASTM D5–52) of about 40 to about 300 and an Asphalt Index of about 9.0 to about 10.5. The asphalt-coated aggregate is then admixed with a thermoplastic resin derived from steam cracked petroleum fractions.

---

This invention relates to a paving composition consisting essentially of aggregate, asphalt and a thermoplastic resin and to a method of preparing such a paving composition.

Admixtures of aggregate and asphalt have been widely used as paving compositions in constructing roadways, playgrounds, walkways, warehouse floors, airport runways and the like. While paving compositions prepared from aggregate and asphalt have given good performance characteristics in some instances, problems have been encountered in producing a paving which is neither too soft at high temperatures nor too brittle at low temperatures. If the paving is hard enough to withstand high temperatures such as those encountered in the summer months, the paving is frequently too brittle in the winter months, particularly in areas where sub-freezing temperatures are encountered and the paving has tendency to crack and disintegrate under heavy traffic. If the paving is sufficiently ductile to withstand low temperatures encountered in the winter months, the paving is frequently too soft to withstand the high temperatures encountered in the summer months.

Although it has been previously suggested to incorporate natural and synthetic rubber together with asphalt and aggregate in paving compositions to improve the ductility and other properties of the asphalt, these compositions have not been entirely satisfactory. Although the physical characteristics of asphalt may be improved initially by the addition of rubber, the initial improvement gradually disappears on hot storage or transportation of hot mix due to depolymerization of the rubber in the hot asphalt.

Paving compositions have also been prepared from aggregate and various natural and synthetic resins without the addition of asphalt but these compositions are frequently very brittle at varying temperatures due to the excess hardening from high mixing and handling temperatures. Furthermore, such compositions require mixing and rolling temperatures that are considerably above the temperatures used in the rolling of conventional asphalt compositions.

We have found that a paving composition having improved resistance to deterioration upon exposure to normal climatic atmospheric conditions can be obtained by coating aggregate with asphalt and thereafter admixing the asphalt-coated aggregate with a small amount of a thermoplastic resin. We have found that the paving composition prepared in accordance with the process of the invention has high cohesiveness, is resistant to temperature susceptibility, has improved rolling characteristics and can be opened to traffic sooner without deterioration or rutting. Further, the paving composition of the invention permits the roller to follow directly behind the paving machine. This paving composition is not dependent upon oxidation for its initial setting or strength as is the case with conventional asphalt pavings. The composition is also more resistant to deterioration by water than conventional asphalt pavings. While we do not wish to be limited to any theory with respect to what takes place when a thermoplastic resin is added to the asphalt-coated aggregate in accordance with our invention, we believe that a portion of the resin may form stable bonds between the asphalt-coated aggregate and also that another portion may fill crevices within the asphalt-coated aggregate, thus in effect forming a lattice work which holds the asphalt-coated aggregate in a stable but flexible sheet when rolled as in the formation of paving.

The process of preparing a paving composition according to the present invention comprises heating the aggregate to a temperature of about 375° to about 400° F., adding asphalt at a temperture of about 300° to about 325° F. to the heated aggregate, admixing the asphalt with the aggregate for a time sufficient to coat the aggregate with asphalt, adding a thermoplastic resin at ambient temperatures to the asphalt-aggregate mass and admixing the resin with the asphalt-aggregate mass at a temperature of about 375° to about 400° F. for a time sufficient to uniformly disperse the resin in the asphalt-aggregate mass.

The aggregate used in accordance with the invention can be any of the conventional types of aggregate used in the construction of paving. The size of the aggregate used in accordance with the invention will vary depending upon the thickness of the paving and also upon the ultimate use of the paving composition. Thus, in instances where the paving encounters very heavy industrial use such as in the floors of warehouses and on loading docks, the thickness of the paving composition may vary from 2 to 6 inches and the aggregate may vary from 1½" down through 200 mesh. Where heavy traffic is encountered such as in driveways, commercial parking, etc., the thickness of the paving may vary from 1 to 3 inches and the aggregate may vary from 1" down through 200 mesh. Where medium traffic is encountered as in alleyways and service stations, the paving may vary from 1 to 4 inches and the aggregate may vary from ¾" down through 200 mesh. Where light traffic is encountered as in playgrounds and walkways, the thickness of the paving may vary from 1 to 3 inches and the aggregate may vary from ⅜" down through 200 mesh. In addition, the aggregate whether to be used in a paving for very heavy, heavy, medium or light traffic may also contain a fine filler such as ground limestone, pulverized sand, silica, clay, carbon black and the like. The amount of any particular gradation of aggregate can be modified depending upon the amount of voids desired and the degree of compaction. In most instances, the degree of compaction is such that the voids comprise about 3 to about 6 percent by volume of the composition. A typical gradation for the aggregate in a paving mix to be used in warehouse floors, loading docks and the like is as follows:

| Sieve size: | Percent by weight passing the sieve |
|---|---|
| 1½″ | 100 |
| 1″ | 90–100 |
| ½″ | 60–70 |
| No. 4 | 32–43 |
| No. 8 | 26–36 |
| No. 30 | 15–25 |
| No. 200 | 0–5 |

The amount of aggregate in the paving composition can vary but in most instances comprises about 90 to about 95 percent by weight of the total composition.

The asphalt used in accordance with the invention can be any of the conventional types of asphalt used in the construction of paving including petroleum tars, petroleum residuums, etc. The asphalt is preferably a steam-refined asphalt or one obtained by a combination of vacuum and steam refining having a penetration (ASTM D5–52) of about 40 to about 300. The particular grade of asphalt used can vary depending upon the climatic temperature conditions encountered when the paving is to be laid down. For example, a paving laid in the hot summer months may be made from a 40/50 grade of asphalt whereas a paving laid in cooler weather may be made from an 85/100 grade of paving asphalt. In order to produce a paving composition which will not ravel, crumble, bleed or tear and which is not too soft, we have found that a critical relationship exists between the penetration of the asphalt measured at 95° F. and the penetration of the asphalt measured at 68° F. The critical relationship applies to all asphalts having penetrations of 40 to 300 as measured in accordance with ASTM D5–52. The penetration ratio is an indication of the amount of hardening of the asphalt which occurs as the result of reducing the temperature thereof. The critical penetration relationship which we employ is referred to hereinafter as the Industrial Asphalt (I.A.) index and is represented by the following equation:

$$\text{I.A. index} = \frac{2 \times P_1}{P_2}$$

where $P_1$ is the penetration of the asphalt measured at 95° F. with a 50 gram load for a period of 3 seconds and $P_2$ is the penetration of the asphalt measured at 68° F. with a 50 gram load for a period of 3 seconds. We have found that the I.A. index of the asphalt to obtain optimum characteristics in the finished paving should be about 9.0 to about 10.5. Inasmuch as the characteristics of some asphalts may change more upon being heated than other asphalts it is preferable to use an asphalt having an I.A. index within the range of 9.0 to 10.5 both before and after heating the asphalt to 325° F. To this end, the I.A. index of the asphalt is measured before and after the thin film test for asphaltic compounds (ASTM D6–39). The thin film test is designed to determine the loss in weight of asphalt upon being heated on a slowly rotating (5 to 6 r.p.m.) shelf in an oven at a temperature of 325° F. Thus, by measuring the penetration of the asphalt at 68° and 95° F. before and after the thin film test, it can be determined whether the asphalt has the desired I.A. index of 9.0 to 10.5 both before and after heating the asphalt to 325° F. If the I.A. index of the asphalt remains within the range of 9.0 to 10.5 both before and after the thin film test, the asphalt will retain its physical characteristics upon subsequent use in an asphalt paving plant where the asphalt is usually heated to a temperature of about 300° to about 325° F. prior to being admixed with aggregate. Typical properties of summer (40/50) and winter (85/100) grades of asphalt useful according to the present invention are as follows:

| Asphalt Characteristics | Summer (40/50) Grade | Winter (85/100) Grade |
|---|---|---|
| Original Penetration (ASTM D5–52) at— | | |
| 77° F., 100 g., 5 sec | 42 | 92 |
| 95° F., 50 g., 3 sec | 59 | 139 |
| 68° F., 50 g., 3 sec | 12 | 28 |
| I.A. Index Before Thin Film Test | 9.8 | 9.9 |
| Ductility (ASTM D113–44) at 77° F., cm | 150+ | 150+ |
| Flash Point (PMCC), ° F., Min | 460 | 460 |
| Viscosity at 275° F., SFS | 220–310 | 145–210 |
| Float Test (ASTM D139–49) at 150° F., sec | 350–400 | 190–220 |
| Solubility in CCl₄, Percent | 99.98 | 99.98 |
| Spot Test, Xylene-Heptane Equivalent, Max | 25 | 25 |
| Thin Film Test (ASTM D6–39), Percent Loss 5 hrs. at 325° F., Max | 0.52 | 0.65 |
| Penetration (ASTM D5–52), After Thin Film Test at— | | |
| 95° F., 50 g., 3 sec | 43.5 | 82 |
| 68° F., 50 g., 3 sec | 9 | 17 |
| Ductility (ASTM D113–49), After Thin Film Test at 77° F., cm | 150+ | 150+ |
| I.A. Index After Thin Film Test | 9.7 | 9.7 |

The amount of the asphalt in the paving composition can vary but in most instances comprises about 3 to about 10 percent by weight, preferably about 4 to about 8 percent by weight of the total composition.

The resin used in accordance with the invention is a thermoplastic hydrocarbon resin derived preferably from unsaturated petroleum hydrocarbon fractions obtained by the high temperature steam cracking of petroleum. The resin is one having a softening point of about 150° to about 250° F., preferably about 200° to about 240° F. The resin contains little or no aromatics and is substantially free of cross-linking. The average molecular weight of the resin is about 800 to about 1500, preferably about 1400 to about 1500. The specific gravity of the resin is about 0.96 to about 0.98.

The thermoplastic resins which we employ can be prepared by known processes for preparing petroleum resins. Neither the resins per se nor their method of preparation constitutes any portion of the present invention. The resins can be prepared by polymerizing a $C_5$ to $C_7$ unsaturated hydrocarbon stream with an aluminum halide catalyst or other polymerization catalyst under conventional polymerizing conditions of temperature and pressure. One method for preparing a petroleum resin is disclosed in U.S. Patent No. 2,770,613 which issued on Nov. 13, 1956, to B. R. Tegge and F. W. Banes. According to the patent, a $C_5$ plus unsaturated hydrocarbon stream boiling up to 280° C. is polymerized with a fluid aluminum chloride catalyst. The reactor effluent is then treated with water at 100° to 200° C. at superatmospheric pressure. The hydrolyzed mixture is then stripped to recover an unreacted hydrocarbon fraction and a light-colored, low ash resin. Another method for preparing a petroleum resin is disclosed in U.S. Patent No. 2,734,046 which issued on Feb. 7, 1956, to J. F. Nelson, R. F. Leary and F. W. Banes. According to the latter patent, a steam-cracked petroleum fraction boiling between about 20° and 140° C. is heated to dimerize substantially all of the cyclodienes. The dimerized cyclodienes are separated from the remaining constituents comprising a mixture containing about 11 to 25 percent by weight of diolefins. The mixture containing the diolefins is then polymerized in the presence of an aluminum halide catalyst at a temperature of about −40° to +70° C. to form a light-colored resin.

A number of suitable thermoplastic hydrocarbon resins derived from the high temperature steam cracking of petroleum are available commercially. Suitable resins, for example, which are known as "Piccopale Hydrocarbon Resins" are available from Pennsylvania Industrial Chemical Corporation, Clairton, Pa. The "Piccopale" resins are produced from a mixture of monomers having an approximate average molecular weight of 90, and composed of dienes and reactive olefins. The resins are a mixture of straight-chain hydrocarbon resins in which cyclic structures are present but there are no aromatics present. These resins contain tertiary hydrogen atoms in their molecular structure which give rise to misleading results when the material is analyzed for unsaturation by the Wijs iodine method unless a correction is made for substitution. An iodine value of 145 by the usual (Wijs) method when corrected for the presence of hydrogen halide from substitution gives a corrected iodine value of 60.

Typical properties of commercially available "Piccopale" steam-cracked petroleum resins having softening points of about 158° F. (70° C.) to about 230° F. (110° C.) are as follows:

"PICCOPALE" PETROLEUM HYDROCARBON RESINS

Properties for all grades:
    Form _____ Thermoplastic solid
    Specific gravity at 25/25° C. _____ 0.96–0.98
    Color, coal tar scale _____ 2
    Color, Gardner Scale _____ 11
    Refractive index _____ 1.53
    Specific heat _____ 0.45
    Acid number _____ <1
    Saponification number _____ <1
    Ash, weight percent _____ <0.1

| Specific Grade of "Piccopale" | 70 | 85 | 100 | 110 |
|---|---|---|---|---|
| Softening point (ball and ring), ° F | 158 | 185 | 212 | 230 |
| Molecular weight | 880 | 1,000 | 1,400 | 1,500 |
| Bromine number (electrometric) | 25 | 30 | 36 | 37 |
| Iodine number (Wijs method) | 145 | 145 | 145 | 145 |
| Iodine number (corrected) | 40 | 50 | 60 | 60 |
| Flash point (C.O.C.), ° F | 450 | 475 | 510 | 550 |
| Fire point (C.O.C.), ° F | 475 | 525 | 575 | 605 |

The amount of the resin used in accordance with the invention can vary depending upon the characteristics desired in the final composition but in most instances comprises about 0.3 to about 3 percent by weight, preferably about 0.8 to about 2 percent by weight of the total composition. The weight ratio of the resin to the asphalt in the paving composition is within the range of about 1:2 to about 1:10, preferably about 1:4 to about 1:6.

If desired, other additives normally used in preparing paving compositions can be used such as anti-stripping agents, asbestos fibers and the like.

The process of the invention will be more readily understood by referring to FIGURE 1 which is a diagrammatic illustration, partly in perspective, of the flow plan utilized in producing the paving composition.

FIGURE 2 is a longitudinal sectional view of a twin shaft pug mill used to mix the aggregate, asphalt and resin.

Referring now to FIGURE 1, aggregate which has been heated to a temperature of about 375° to about 400° F. in a dryer (not shown) is introduced by chute 10 to the top side of a three-deck vibrating screen 11. Hot aggregates are separated by the vibrating screen 11 according to size and passed into storage bin compartments 12, 13 and 14. Aggregates proportioned as desired are removed from compartments 12, 13 and 14 through gates 16, 17 and 18 and dropped into weigh hopper 20. When the desired amount of aggregate as measured by a dial scale 21 is collected in weigh hopper 20, the measured aggregate is passed from weigh hopper 20 into mixer 22. Mixer 22 can be any conventional mixer used in the asphalt paving industry such as a twin-shaft pug mill.

By referring to FIGURE 2, which is a longitudinal sectional view of mixer 22, it will be noted that the mixer has twin shafts 15 and 19 upon which paddles 23 are mounted. Adjacent paddles on each shaft are mounted at right angles to each other to facilitate rapid homogenization. In mixer 22, the twin shafts 15 and 19 are rotated at any desired speed such as a speed of about 80 r.p.m.

Now, with further reference to FIGURE 1, while the aggregate is being weighed in weigh hopper 20, a paving grade of asphalt at a temperature of about 300° to about 325° F. is pumped by pump 24 from storage tank 25 through conduit 26 to weigh bucket 27. The desired amount of asphalt is measured in weigh bucket 27 by a dial scale 28. When the desired amount of asphalt is collected in weigh bucket 27, the asphalt is introduced into mixer 22 through a flow pipe 29. Flow pipe 29 provides for uniform distribution of the asphalt to mixer 22. The asphalt from weigh bucket 27 and aggregate from weigh hopper 20 are introduced substantially simultaneously into mixer 22.

The aggregate and asphalt are mixed in mixer 22 for a time sufficient to coat the aggregate with asphalt. While the time may vary depending upon the efficiency of the mixer and the nature of the aggregate we have found that a period of about 10 to 20 seconds is usually sufficient. After the aggregate is coated with asphalt, the desired amount of resin is introduced into the center of mixer 22 through chute 30. The resin can be introduced as a solid at ambient temperatures or if desired the resin can be heated to its melting point and then introduced as a liquid. The asphalt-coated aggregate is then admixed with the resin for a time sufficient to uniformly disperse the resin in the asphalt-aggregate mass. While again the time required may vary depending upon the efficiency of the mixer, we have found that substantially complete dispersion is effected in a period of about 40 to 50 seconds. This time can be reduced to about 20 to about 30 seconds if the resin is introduced as a liquid. After mixing of the resin is complete, the paving composition consisting essentially of asphalt, aggregate and resin at a temperature of about 350° F. to about 375° F. is removed from mixer 22 through a mixer gate 31 into a truck 32 for transportation to the paving site.

In a specific embodiment of the invention 3,768 pounds of aggregate at a temperature of about 375° F. are introduced into mixer 22 simultaneously with about 192 pounds (4.8 percent by weight based on the weight of the total paving composition) of a 40/50 asphalt at a temperature of about 300° F. The aggregate has the following approximate make-up.

|  | Pounds |
|---|---|
| ⅜" rock | 1,248 |
| ½" rock | 920 |
| Sand | 1,600 |
| Total | 3,768 |

The 40/50 asphalt has the following typical properties.

Original penetration (ASTMD 5–52):
    At 77° F., 100 g., 5 sec. _____ 42
    At 95° F., 50 g., 3 sec. _____ 59
    At 68° F., 50 g., 3 sec. _____ 12
I.A. index before thin film test _____ 9.8
Ductility (ASTM D113–44) at 77° F., cm. _____ 150+
Flash point (PMCC), ° F. _____ 465
Viscosity at 275° F., SFS _____ 306
Float Test (ASTM D139–49) at 150° F., sec. _____ 354
Solubility in CCl₄, percent _____ 99.98
Spot test, xylene-heptane equivalent _____ 20–25
Thin film test (ASTM D6–39), percent loss 5 hrs
    at 325° F. _____ 0.40
Penetration (ASTM D5–52) after thin film test:
    At 77° F., 100 g., 5 sec. _____ 28
    At 95° F., 50 g., 3 sec. _____ 43.5
    At 68° F., 50 g., 3 sec. _____ 9.0
Percent of original penetration at 77° F., percent ___ 66.7
Ductility (ASTM D113–44) after thin film test at
    77° F., cm. _____ 150+
I.A. index after thin film test _____ 9.7

The asphalt and aggregate are admixed in mixer 22 for about 10 to about 20 seconds. Into the center of mixer 22 are then introduced about 40 pounds (1 percent by weight based on the weight of the total paving composition) of "Piccopale 110" resin particles at ambient temperature.

The resin particles have the following typical properties:
Form _____ Thermoplastic solid.
Softening point (ball and ring), ° F. _____ 230
Specific gravity _____ 0.97
Color, Gardner scale _____ 11
Flash point (C.O.C.), ° F. _____ 550
Fire point, ° F. _____ 605
Acid number _____ <1
Saponification number _____ <1
Bromine number (electrometric) _____ 37
Molecular weight _____ 1500
Iodine number (Wijs method) _____ 145
Iodine number (corrected) _____ 60

The contents of the mixer are then agitated for about 40 to about 50 seconds after which the completed paving composition is dumped into a truck for transportation to the paving site. The paving composition thus obtained has the following Marshall stabilities when tested in cylinders having an average bulk density of 2.328 and containing 4.2 percent by volume of voids:

| Marshall Tests (4,000 lbs.—50 blows) | Stability, Pounds | Flow, 1/100" |
|---|---|---|
| 10 Minutes at 140° F | 6,615 | 12.3 |
| 20-30 Minutes at 140° F | 6,005 | 12.8 |
| 60 Minutes at 140° F | 5,490 | 12.0 |
| 24 Hours at 140° F | 5,040 | 12.2 |

$$\text{Relation of} \frac{\text{Stability at 24 hrs.}}{\text{Stability at 20-30 Min.}} \times 100 = 83.9$$

The Marshall stability tests reported herein were made in accordance with the "Marshall Method of Mix Design" described on pages 19 to 38 of the manual entitled, "Mix Design Methods for Hot-Mix Asphalt Paving." The Asphalt Institute, First Edition, Manual Series No. 2, University of Maryland, College Park, Md., April 1956. The load in pounds, at failure, or the maximum load, is called the Marshall stability load, and indicates the strength of the composition against shearing forces. The amount of deformation at failure (or at maximum load) is given in 1/100 of an inch, and is called the "Flow." The Marshall stability test is usually made at 140° F. for 20–30 minutes, but may also be made for shorter or longer periods of time for comparison.

In order to illustrate the importance of following the sequence of steps of the present invention, the above illustrative embodiment was repeated with the exception that the resin was introduced into the mixer prior to introducing the asphalt. In this instance the paving composition showed no increase in strength, workability or durability until 2 to 2½ percent of the resin based on the weight of the total paving composition had been added to the mixture. Inasmuch as it is desirable from the standpoint of economics to use the least amount of resin required to give an improved paving composition, i.e., preferably about 1 percent, the addition of the resin prior to the asphalt addition is undesirable.

In order to illustrate still further the importance of following the sequence of steps of the present invention, the illustrative embodiment was again repeated except in this instance 1 to 2 percent of resin based on the weight of the total paving composition was added to the asphalt and thereafter the asphalt-resin mixture was introduced into the mixer containing the aggregate. In this instance, the paving composition had properties that were not substantially different from a normal paving grade of asphalt which contained no resin.

In order to illustrate the improved properties of paving compositions obtained in accordance with the invention (Compositions B and D) as compared with conventional asphalt paving compositions (Compositions A and C) comparative compositions were made under similar conditions except in one instance no resin was employed. The following is a summary of data obtained from actual field applications relative to the comparative compositions using 40/50 and 85/100 paving grade asphalts.

| | A | B | C | D |
|---|---|---|---|---|
| Make up, percent by wt.: | | | | |
| Aggregate | 94.3 | 94.7 | 93.2 | 93.4 |
| Asphalt 40/50 having an I.A. index of 9.8 | 5.7 | 4.3 | | |
| Asphalt 85/100 having an I.A. index of 9.9 | | | 6.8 | 5.6 |
| Resin ("Piccopale 110") | | 1.0 | | 1.0 |
| Weight ratio of resin to asphalt | | 1:4.3 | | 1:5.6 |
| Marshall Tests—Stability, pounds: | | | | |
| 10 minutes at 140° F | | | 2,000 | 3,285 |
| 20-30 minutes at 140° F | 3,200 | 4,415 | 1,855 | 2,845 |
| 60 minutes at 140° F | | | 1,665 | 2,775 |
| 24 hours at 140° F | 1,850 | 3,625 | 980 | 2,295 |
| Relation of: | | | | |
| $\frac{\text{Stability at 24 hrs.}}{\text{Stability at 20-30 Min.}} \times 100$ | 57.8 | 82.1 | 52.8 | 80.7 |

The above data show that compositions obtained in accordance with the invention (Compositions B and D) have Marshall stabilities considerably above the Marshall stabilities of conventional asphalt compositions (Compositions A and C). The data show further that the Compositions B and D retain their improved stability much longer than Compositions A and C. For example, it will be noted that Compositions B and D after 24 hours at 140° F. retained better than 80 percent of the stability which they exhibited at 20 to 30 minutes. Compositions A and C, on the other hand, retained only a little better than half the stability which they had at 20 to 30 minutes. This indicates that paving compositions made in accordance with the invention have considerably longer useful lives than corresponding pavements made only from aggregate and asphalt.

In another field test of a paving composition consisting of 94.2 percent by weight of mineral aggregate, 4.8 percent by weight of a 40/50 paving grade asphalt having an I.A. index of 9.9 and 1.0 percent by weight of "Piccopale 110" prepared in accordance with the invention, it was found that (1) the paving composition was easier to handle than a conventional asphalt paving mixture, (2) the paving composition of the invention set up on the first pass of the roller whereas a conventional asphalt paving composition requires a number of rollings and (3) no wave occurs in front of the roller even in the first pass when rolling a composition of the invention whereas a wave occurs in front of the roller even after several passes when rolling a conventional asphalt paving composition.

While our invention has been described above with reference to various specific examples and embodiments, it will be understood that the invention is not limited to such illustrative examples and embodiments, and may be variously practiced within the scope of the claims hereinafter made.

We claim:
1. A process of preparing a paving composition which comprises heating aggregate to a temperature of about 375° to about 400° F.; adding to the heated aggregate about 3 to about 10 percent by weight based on the weight of the total paving composition of asphalt at a temperature of about 300° to about 325° F., said asphalt having a penetration (ASTM D5–52) of about 40 to about 300 and an Industrial Asphalt index of about 9.0 to about 10.5, said Industrial Asphalt index being represented by the equation:

$$\text{Industrial Aspalt index} = \frac{2 \times P_1}{P_2}$$

where $P_1$ is the penetration of the asphalt measured at 95° F. with a 50 gram load for a period of 3 seconds and $P_2$ is the penetration of the asphalt measured at 68° F. with a 50 gram load for a period of 3 seconds; admixing said asphalt with said heated aggregate for a time sufficient to coat the aggregate with asphalt; adding to the asphalt-aggregate mass about 0.3 to about 3 percent by weight based on the weight of the total paving composition of a thermoplastic resin at ambient temperature, said resin being derived from steam cracked petroleum fractions and having a softening point of about 150° to about 250° F. and an average molecular weight of about 800 to about 1500, the weight ratio of the resin to the asphalt in the paving composition being in the range of about 1:2 to about 1:10; and admixing said resin with the asphalt-aggregate mass at a temperature of about 375° to about 400° F. for a time sufficient to uniformly disperse said resin in the asphalt-aggregate mass.

2. A process of preparing a paving composition according to claim 1 in which the size of the aggregate is within the range of 1½ inches through 200 mesh.

3. A process of preparing a paving composition according to claim 1 in which the resin has a softening point of about 200° to about 240° F. and an average molecular weight of about 1400 to about 1500.

4. A process of preparing a paving composition according to claim 1 in which the size of the aggregate is within the range of 1½ inches through 200 mesh, the resin has a softening point of about 200° to about 240° F. and an average molecular weight of about 1400 to about 1500 and the weight ratio of the resin to the asphalt in the paving composition is within the range of about 1:4 to about 1:6.

5. A process of preparing a paving composition which comprises heating aggregate to a temperature of about 375° to about 400° F.; adding to the heated aggregate about 4 to about 8 percent by weight based on the weight of the total paving composition of asphalt at a temperature of about 300° to about 375° F., said asphalt having a pentration (ASTM D5-52) of about 40 to about 100 and an Industrial Asphalt index of about 9.0 to about 10.5, said Industrial Asphalt index being represented by the equation:

$$\text{Industrial Asphalt index} = \frac{2 \times P_1}{P_2}$$

where $P_1$ is the penetration of the asphalt measured at 95° F. with a 50 gram load for a period of 3 seconds and $P_2$ is the penetration of the asphalt measured at 68° F. with a 50 gram load for a period of 3 seconds; admixing said asphalt with said heated aggregate for a period of about 10 to about 20 seconds at a temperature of about 375° to about 400° F.; adding to the asphalt-aggregate mass about 0.8 to about 2 percent by weight based on the weight of the total paving composition of a thermoplastic resin at ambient temperature, said resin being derived from steam cracked petroleum fractions and having a softening point of about 230° F. and an average molecular weight of about 1500, the weight ratio of the resin to the asphalt in the paving composition being in the range of about 1:4 to about 1:6; and admixing said resin with the asphalt-aggregate mass for a period of about 40 to about 50 seconds at a temperature of about 375° to about 400° F.

6. A process of preparing a paving composition which comprises heating about 90 to about 95 parts by weight of aggregate to a temperature of about 375° to about 400° F.; adding to said heated aggregate about 4 to about 6 parts by weight of asphalt at a temperature of about 300° to about 325° F., said asphalt having a penetration (ASTM D5-52) of about 40 to about 100 and an Industrial Asphalt index of about 9.0 to about 10.5, said Industrial Asphalt index being represented by the equation:

$$\text{Industrial Asphalt index} = \frac{2 \times P_1}{P_2}$$

where $P_1$ is the penetration of the asphalt measured at 95° F. with a 50 gram load for a period of 3 seconds and $P_2$ is the penetration of the asphalt measured at 68° F. with a 50 gram load for a period of 3 seconds; admixing said asphalt with said heated aggregate for a period of about 10 to about 20 seconds at a temperature of about 375° to about 400° F.; adding to the asphalt-aggregate mass about 1 part by weight of a thermoplastic resin at ambient temperature, said resin being derived from steam cracked petroleum fractions and having a softening point of about 230° F. and an average molecular weight of about 1500, the weight ratio of the resin to the asphalt in the paving composition being in the range of about 1:4 to about 1:6; and admixing said resin with the asphalt-aggregate mass for a period of about 40 to 50 seconds at a temperature of about 375° to about 400° F.

References Cited

UNITED STATES PATENTS 3,070,570  8/1959  Gessler et al. _____ 260—41.5
3,128,261  12/1960  Lane et al. _____ 106—284

OTHER REFERENCES

Piccopale Resin—Pennsylvania Industrial Chemical Corp., 1948, p. 14.

Abraham—Asphalts and Allied Substances, vol. III–D. Van Nostrand Co., N.Y., 1962, TN853 A35. Copy in Group 140, pp. 149–157.

MORRIS LIEBMAN, *Primary Examiner.*

H. S. KAPLAN, *Assistant Examiner.*